United States Patent [19]

Gill

[11] Patent Number: 5,131,591
[45] Date of Patent: Jul. 21, 1992

[54] DEVICE FOR MEASURING FLOW

[75] Inventor: David C. Gill, Keynsham, United Kingdom

[73] Assignee: Nomix Manufacturing Company, United Kingdom

[21] Appl. No.: 399,861

[22] Filed: Aug. 29, 1989

[30] Foreign Application Priority Data

Sep. 5, 1988 [GB] United Kingdom ............... 8820841
Nov. 3, 1988 [GB] United Kingdom ............... 8825697

[51] Int. Cl.⁵ ............................................... G01F 15/00
[52] U.S. Cl. ....................................... 239/74; 239/590; 73/3; 73/865.9; 222/71
[58] Field of Search ...................... 239/74, 590; 222/71-73; 73/1 R, 3, 865.9

[56] References Cited

U.S. PATENT DOCUMENTS

| | | | |
|---|---|---|---|
| 1,806,192 | 5/1931 | Collins | 239/74 |
| 2,013,431 | 9/1935 | Bechtold | 222/73 |
| 2,546,188 | 3/1951 | Keller | 222/71 |
| 2,767,581 | 10/1956 | Moorehead . | |
| 3,657,919 | 4/1972 | Brown . | |
| 4,073,304 | 2/1978 | Lerner et al. . | |
| 4,184,367 | 1/1980 | Jenney et al. . | |
| 4,324,127 | 4/1982 | Gazzara et al. . | |
| 4,331,262 | 5/1982 | Snyder et al. . | |
| 4,663,960 | 5/1987 | Makkink | 73/3 |
| 4,723,437 | 2/1988 | McKenzie . | |
| 4,889,001 | 12/1989 | Gill | 73/865.9 |
| 4,928,514 | 5/1990 | Beaston | 73/3 |

FOREIGN PATENT DOCUMENTS

| | | |
|---|---|---|
| 2289165 | 5/1976 | France . |
| 705396 | 3/1954 | United Kingdom . |
| 888244 | 1/1962 | United Kingdom . |
| 941258 | 11/1963 | United Kingdom . |
| 1015150 | 12/1965 | United Kingdom . |
| 1160472 | 8/1969 | United Kingdom . |
| 2032627 | 5/1980 | United Kingdom . |
| 2059074 | 4/1981 | United Kingdom . |
| 2083438 | 3/1982 | United Kingdom . |
| 2147107 | 5/1985 | United Kingdom . |
| 2151785 | 7/1985 | United Kingdom . |
| 2172524 | 9/1986 | United Kingdom . |
| 8301506 | 4/1983 | World Int. Prop. O. . |

Primary Examiner—Andres Kashnikow
Assistant Examiner—Karen B. Merritt
Attorney, Agent, or Firm—Merchant, Gould, Smith, Edell Welter & Schmidt

[57] ABSTRACT

Fluid delivery equipment, for example for distributing herbicide, is calibrated to provide a correct flow rate by performing a test cycle in which the fluid flows into a measuring device for a predetermined time, after which the volume of fluid in the measuring device is established to determine whether or not the flow rate corresponds to the desired flow rate. The measuring device establishes a flow path having two reverse bends (36, 30) with the reverse bend (36) bypassed by a vent hole (32). The level of liquid in the measuring device after a test is, for example, established by means of a graduated scale provided on a card (40) which is removably attached to a package containing the fluid to be distributed.

9 Claims, 4 Drawing Sheets

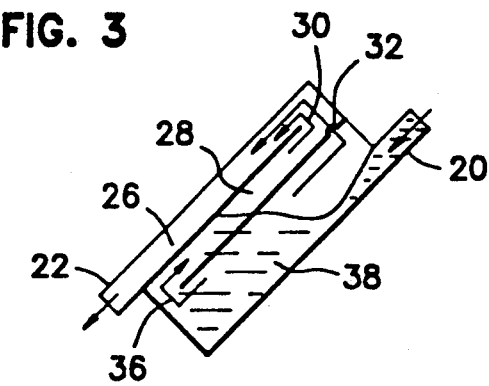
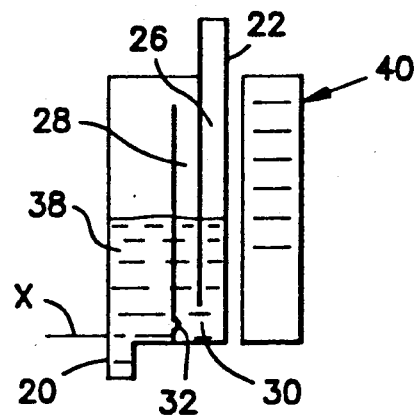
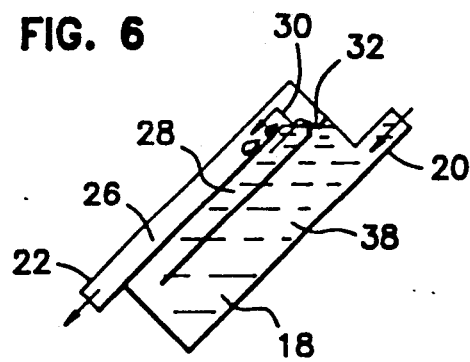
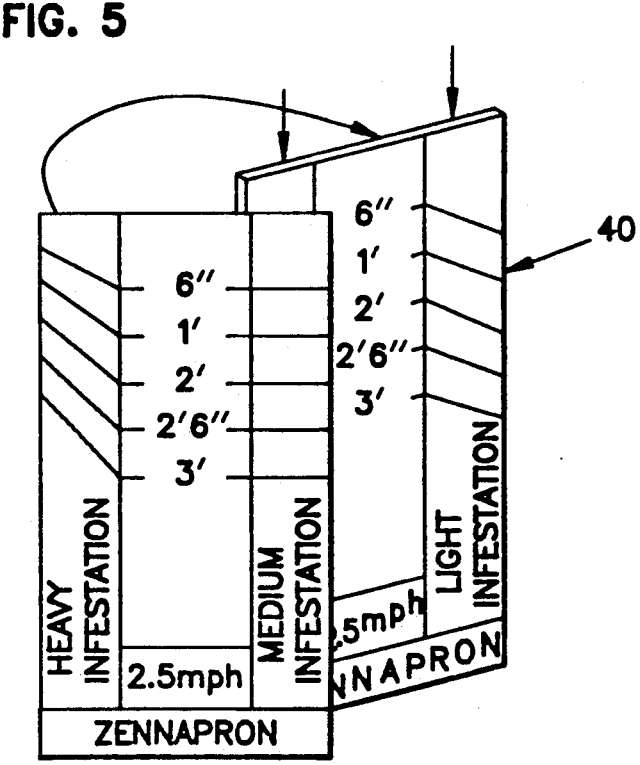

ately to rely on a rough-and-ready setting of the equipment. Hitherto, equipment has been calibrated to establish accurate flow rates by operating the equipment so that the fluid is delivered into a measuring jar. The equipment is operated for a predetermined time, for example one minute, the volume of fluid delivered into the measuring jar is then measured, and a calculation is performed to determine the actual flow rate of herbicide. The equipment is then adjusted, and the operation repeated, until a desired flow rate is achieved.

DEVICE FOR MEASURING FLOW

FIELD OF THE INVENTION

This invention relates to a device for measuring flow in a fluid line and is particularly, although not exclusively, concerned with such a device for use in the calibration of delivery equipment for herbicides.

BACKGROUND OF THE INVENTION

Different herbicide formulations have different properties, and in particular their viscosities may be different. Thus, where herbicide is fed through a restrictor to a distribution element for distribution over the ground, the flow rates through the restrictor will not be the same for two different formulations. Furthermore, the flow rate of herbicide will vary from one piece of equipment to another, even when they are set to give the same nominal flow rate. Additionally, the flow rate of herbicide must be adapted to the nature of the herbicide, the level of infestation of the weeds to be controlled, the width of spraying, and the speed at which the equipment is moved over the ground.

Modern herbicides are highly effective, and very small volumes of undiluted herbicide are often used, rather than the highly diluted formulations which have been used in the past. Consequently, for maximum effectiveness and efficiency, there must be very accurate control of the rate of delivery of the herbicide from the delivery equipment. It is not, in most cases, adequate merely to rely on a rough-and-ready setting of the equipment. Hitherto, equipment has been calibrated to establish accurate flow rates by operating the equipment so that the fluid is delivered into a measuring jar. The equipment is operated for a predetermined time, for example one minute, the volume of fluid delivered into the measuring jar is then measured, and a calculation is performed to determine the actual flow rate of herbicide. The equipment is then adjusted, and the operation repeated, until a desired flow rate is achieved.

The problem with this procedure is that the substantial quantities of herbicide which are delivered into the measuring jar need to be disposed of. Modern herbicides are expensive, and consequently it is wasteful merely to throw it away. Moreover, the herbicide must be disposed of with care if unwanted damage to plants, and dangers to humans and animals, are to be avoided. Safe disposal can be a particular problem to an operator who is working at some distance from an appropriate waste disposal facility.

These problems are particularly acute where the herbicide for distribution is contained in a package which has a small outlet aperture for connection to the equipment, but which has no provision for refilling.

Our British patent application No. 8715222 discloses a calibration vessel which can be fitted releasably to fluid delivery equipment for measuring the delivery rate. At the end of a test, the fluid collected in the vessel can be returned to the original container through the delivery equipment. With this known device, however, the calibration vessel is separate from the delivery equipment, and consequently there is the danger of it becoming mislaid. Also, there is the inconvenience of having to clean the vessel as well as the delivery equipment.

SUMMARY OF THE INVENTION

According to the present invention there is provided a device for measuring flow in a fluid line, the device having an inlet and an outlet, for connection to the fluid line, and defining a flow path between the inlet and the outlet which has two reverse bends, the reverse bend nearer the outlet, along the flow path, communicating with the inlet through a vent which bypasses the reverse bend nearer the inlet, along the flow path.

Where the device is used to measure the flow rate of herbicide through hand-held delivery equipment, the device is mounted in the fluid line to the spraying head, with the inlet disposed at a higher level than the outlet.

The equipment is then operated to cause the fluid (such as herbicide) to flow down the fluid line towards the spraying head. The herbicide is caused to flow to the entry of the measuring device and operation is then continued for a predetermined time, such as thirty seconds. This period is selected so that, for normal flow rates, the herbicide will not reach the reverse bend nearer the outlet and consequently, during the test, no herbicide will flow to the spraying head.

At the end of the predetermined period, flow in the fluid line is terminated, and the volume of herbicide which has reached the measuring device is compared with a reference volume, corresponding to the desired flow rate. If the actual volume differs from the reference volume, appropriate adjustments to the equipment can be made, and the test repeated.

Alternatively, the equipment may be operated until a predetermined volume of fluid has entered the measuring device. In this case, the time taken for that flow is a measure of the fluid flow rate.

For ease of use, it is preferable for the measuring device to include a transparent wall, or to be made entirely from transparent material, so that the level of herbicide in the measuring device can be ascertained readily. The transparent wall may, conveniently, be provided in the limb of the measuring device extending between the inlet and the adjacent reverse bend.

The device may comprise a housing defining a chamber, most of which constitutes the limb of the measuring device extending between the inlet and the adjacent reverse bend. The intermediate limb between the reverse bends, and the limb extending from the downstream reverse bend to the outlet, may be constituted by two limbs of a U-tube, in which case the vent may comprise a hole at the bend of the U-tube.

Preferably, the device is incorporated in hand-held fluid delivery equipment.

According to a second aspect of the present invention, there is provided hand-held fluid delivery equipment comprising a handset, a spraying head and a tubular member connected therebetween and at least partially defining a flow path for fluid, the equipment further comprising means for determining the flow rate of fluid, located in the flow path.

In a preferred embodiment of this aspect of the invention, the means for determining the flow rate may be provided directly in the tubular member. The tubular member may be provided with graduations, visible to an operator of the equipment, which enable that operator to determine a volume of fluid which has flowed into the tubular member in a certain time period, and thus allow the flow rate to be calculated.

In preferred embodiments, fluid delivery equipment according to the second aspect of the invention, or incorporating a device according to the first aspect of the invention, may include at least one electronic calibration device. Such a device may generate regular signals, such as bleeping tones, to assist in measurement of a time period.

Additionally, or alternatively, the measuring device, or the means for determining the flow rate, may be provided with an electronic calibration device. For example, when the time required for a given volume of liquid to flow is to be measured, the equipment may be provided with a float, which triggers an electrical or electronic circuit, causing generation of a tone, at the beginning of the test and when the given volume of liquid has entered the device.

In a modification of the invention, the equipment may be as described, in British Patent Application No. 8821719.5, and the fluid flow rate may be determined by the properties of a supply pump, which is operated in dependence on the speed of travel of wheeled equipment, in order to ensure equal supplies of fluid to equal areas which are to be sprayed. During calibration of such equipment the speed sensor can be adapted to emit audible tones each time the equipment travels a predetermined distance (for example equivalent to one rotation of the wheels). These tones can be used to determined whether a required volume of fluid is obtained from the supply pump while a given distance is travelled.

The measuring device may be graduated in order to enable the comparison to be made between the actual volume of herbicide entering the measuring device during a test and the reference volume. However, since different herbicides, and different levels of infestation, will require different flow rates of herbicide, it is preferable for the measuring device to be used in conjunction with a separate scale for each type of herbicide. Thus, according to another aspect of the present invention, there is provided a package containing a liquid or other fluent material, the package including a graduated scale which is usable with a measuring device for establishing a predetermined volume of the liquid or fluent material.

The scale may, for example, comprise a support element such as a card on which appropriate information is printed; alternatively the scale may be printed on an adhesive label. It may be attached to the rest of the package, for example to a container in which the liquid or other fluent material is contained, by any appropriate means, for example by means of a line of perforations. Alternatively, it may be contained in an envelope affixed to the package.

Where the graduated scale is applied to a card, the card may comprise several graduated scales for different purposes. For example, the graduated scales may relate to different levels of infestation by the weed to be controlled, to different widths of spray, and to different speeds at which the delivery equipment is to be transported across the ground.

The measuring device for use with such graduated scales may, of course, be provided with appropriate means for retaining the graduated scale on the measuring device.

BRIEF DESCRIPTION OF THE DRAWING

For a better understanding of the present invention, and to show how it may be carried into effect, reference will now be made, by way of example, to the accompanying drawings, in which:

FIG. 3 shows the measuring device at one stage of a test;

FIG. 4 shows the measuring device at another stage of the test;

FIG. 5 shows graduated scales for use with the measuring device;

FIG. 6 shows the measuring device during normal use of the equipment;

DETAILED DESCRIPTION OF THE INVENTION

Figure 1:
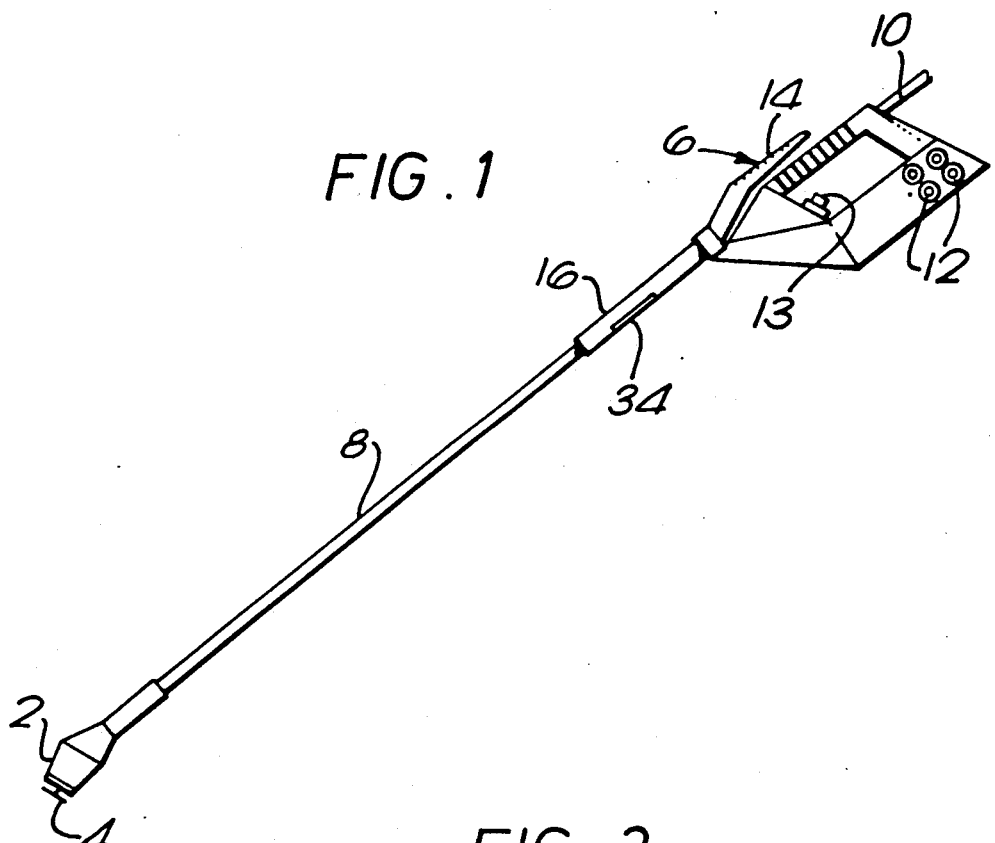
FIG. 1 shows hand-held equipment for delivering a herbicide.

The equipment shown in FIG. 1 comprises a spraying head 2 having a motor-driven distribution element 4 in the form of a disc. The spraying head 2 is connected to a handset 6 by a support tube 8. The handset 6 is connected to a container of herbicide to be delivered by a flexible tube 10. Also, the handset 6 has various control devices, such as knobs 12, 13 for controlling the flow rate of herbicide to the spraying head 2 and the speed of the disc 4. The knob 13 is connected to electrical control means to adjust the speed of the disc 4. The knobs 12 are required, when fluid is supplied to the head 2 by a pump (not shown) to control the speed of the pump. When fluid is supplied to the head 2 under gravity, knobs 12 are not required, and a variable restriction is provided in the flow path.

In normal operation, operation of a trigger 14 opens a valve in the handset 6 to permit herbicide to flow through the tube 10, along a further tube accommodated within the support tube 8, to the spraying head 2, from which it is discharged as a series of droplets by the disc 4. By appropriate adjustment of the control devices 13, it is possible to vary the speed of the disc 4, and consequently the width of spray. The rate of flow of the herbicide towards the spraying head 2 may for example be adjusted by means of a variable restriction located in the flow path.

By way of example, the speed of the disc 4 may be adjusted to give a spraying width of two feet (0.6 m). For a selected speed of application, the flow rate to the head 2 may be adjusted to give a flow suitable to produce the correct dose of the herbicide per area being covered, appropriate to medium infestation of the weed to be controlled.

Figure 2:
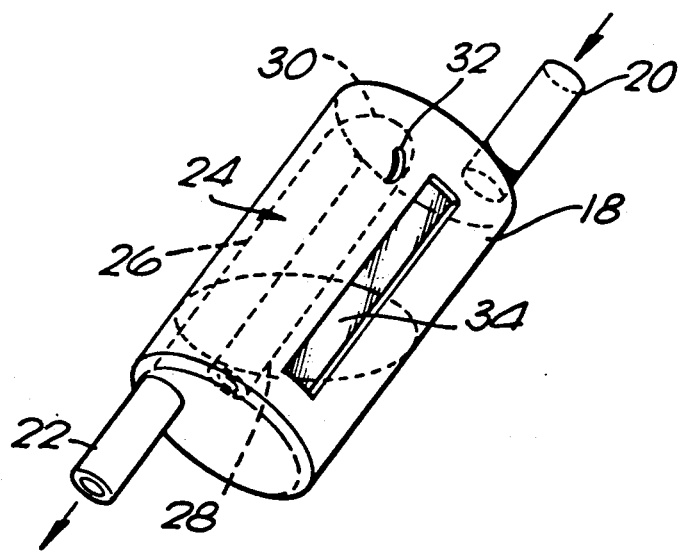
FIG. 2 shows a measuring device for use in the equipment of FIG. 1.

Before beginning spraying, it is desirable to check that the flow rate which is, in fact, supplied to the head 2 corresponds to the flow rate required if the necessary dose per area is to be achieved. For this purpose, there is provided, in the fluid line between the handset and the spraying head 2, a measuring device which is shown in more detail in FIG. 2. By way of example, this measuring device may be accommodated within a tubular member 16 projecting from the handset 6, but it may alternatively be provided elsewhere within the support tube 8, or it may be mounted externally of the support tube 8. The measuring device must be located downstream of the variable restriction, and they can be separated on the support tube and at any positions along the support tube. In one preferred embodiment, the measuring device is located at the lower end of the tube 8 adjacent the spraying head 2, in order to reduce the possibility that air will enter the system at low flow rates.

Figure 7:
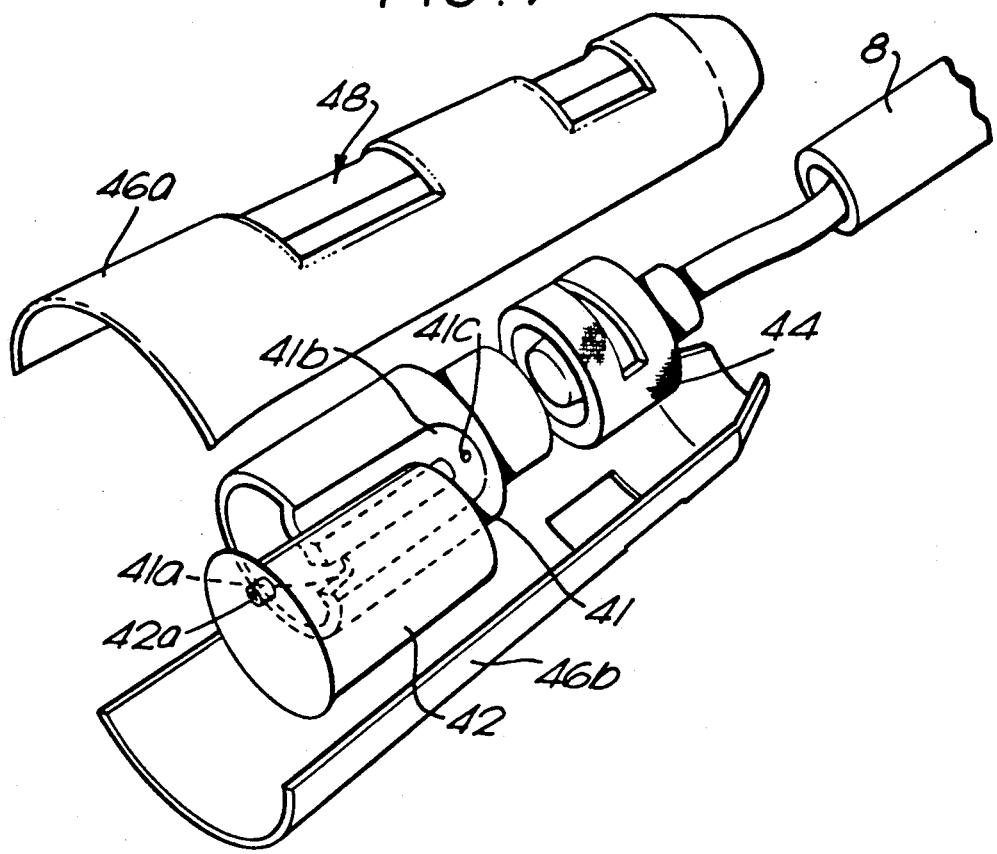
FIG. 7 shows an alternative embodiment of a device according to the invention, located within fluid delivery equipment.

FIG. 7 is an exploded view of a part of an alternative embodiment of the equipment. The housing 41 is located within a cover 42, and the housing 41 and cover 42 define therebetween the intermediate and outlet limbs. Fluid flows into the housing 41 from its upper end, and then flows through the gap 41a into a passage defined by a groove 41b, in the outer surface of the housing, and the inner surface of the cover 42. Fluid then flows through the outlet 42a, which is connected for fluid flow to the spraying head (not shown). A vent hole 41c serves the same purpose as the vent hole 32 shown in FIG. 2. The housing and cover are connected to, and downstream of, a variable restriction 44 provided with a thumbscrew which may be used to alter the rate at which fluid can flow to the spraying head. The housing and cover 41, 42 and variable restriction 44 are located within an injection moulded casing 46a, 46b which is provided with a viewing window 48 allowing monitoring of the liquid level within the housing. The casing is adapted to be connected to the lower end of the tubular member 8 and directly to the spraying head and the motor therefor (not shown).

Referring once more to FIG. 2, the measuring device comprises a housing 18 having an inlet spigot 20 and an outlet spigot 22 at opposite ends. These spigots 20, 22 receive flexible tubes for conveying the herbicide into and out of the measuring device.

The outlet spigot 22 is connected to a U-tube 24 disposed within the housing 18. The U-tube 24 has two limbs 26, 28 interconnected by a reverse bend 30. At the reverse bend 30, there is a vent hole 32 in the tube 24. In one preferred embodiment of the invention, the vent hole 32 may be sealed by a valve operable by a user of the device. The wall of the housing 18 includes a transparent region 34, which makes it possible to see the level of fluid within the housing 18, as will be discussed later.

FIG. 3 shows the measuring device in a diagrammatic manner, in use during a flow test. It will be appreciated that the flow path between the inlet spigot 20 and the outlet spigot 22 includes two reverse bends, namely a reverse bend 36 at the lower end of the limb 28, and the reverse bend 30. Thus, liquid flowing through the measuring device is forced to pass to the bottom (as viewed in FIG. 3) of the housing 18, i.e. down a first limb 38, around the reverse bend 36, up the intermediate limb 28, around the reverse bend 30, and down the limb 26 to the outlet spigot 22.

In order to calibrate the flow from the handset 6 to the head 2, the equipment is first primed, by operating it with the trigger 14 depressed until liquid is visible through the transparent region 34 in the housing 18. The equipment is then inverted (i.e. the head 2 is raised above the handset 6, with the support tube 8 substantially vertical), so that the measuring device assumes the position shown in FIG. 4. The trigger 14 is then operated which permits the liquid to return through the tube 10 to the container. This continues until the level of liquid in the measuring device reaches the position X in FIG. 4, which can be regarded as a zero position. The equipment is then returned to the normal orientation (FIG. 3), and is operated for a predetermined time, such as five or ten seconds. This predetermined time is chosen such that the housing 18 is not overfilled. During this time, assuming a normal flow rate of liquid, the liquid enters the limbs 38 and 28, but does not pass over the reverse bend 30 to the limb 26. As the level in the limb 38 rises, air is discharged to the outlet spigot 22 through the vent hole 32. The vent hole is designed to be small enough that it allows air, but no significant amounts of liquid, to flow through it.

When the predetermined time of five or ten seconds has elapsed, the flow measurement is carried out. The equipment is inverted to the position shown in FIG. 4, with the trigger 14 released, so that the valve is closed and fluid cannot flow through the tube 10. Liquid in the limbs 38 and 28 is then able to flow into the limb 26 through the vent hole 32 and across the reverse bend 30. The level of liquid in the measuring device is then read off against a scale which may be engraved on the flow cup or printed on a card 40. The card 40 is affixed to the equipment, or to the housing 18, by any appropriate means, such as by means of a spring clip, suitable guides, or adhesive. It is positioned adjacent the transparent wall portion 34.

The card 40 is shown in greater detail in FIG. 5. It is printed on both sides with scales corresponding to different levels of infestation by the weed which is to be controlled. The scales are graduated according to the spraying width which is to be used and relate to a specific speed. As shown, the cards are indicated as being suitable for use in connection with ZENNAPRON (Registered Trade Mark). The operator fixes the card 40 to the housing 18 with the appropriate edge of the scale adjacent the transparent region 34. As mentioned above, assuming a spraying width of two feet (0.6 m), and the specific speed of, say, 2.5 mph, the operator is able to establish a volume within the measuring device which corresponds to the desired flow rate to the head 2 in order to distribute the appropriate dose of the herbicide per unit area.

If the level of fluid in the device differs from that indicated by the card 40, the herbicide in the measuring device is returned to the container through the tube 10 by depressing the trigger 14, until the level returns to the level X. Appropriate adjustments are made by means of the control devices 12 (or the variable restrictor 44 when using the device shown in FIG. 7), and the test is then repeated as many times as are necessary in order to obtain a satisfactory correlation between the actual level in the measuring device and the reference level indicated by the card 40.

When an acceptable flow rate has been achieved, normal spraying can begin, and FIG. 6 shows the measuring device during such normal operation. The herbicide fills the limbs 38 and 28 and overflows into the limb 26, to pass to the outlet 22 and the head 2. Also, a small amount of the herbicide may flow directly from the limb 38 to the reverse bend 30 through the vent hole 32. If, as discussed previously, a valve is provided at the vent hole 32, the valve should be operated to seal the vent hole during this phase of the operation. Then, even when the supply of herbicide is exhausted, liquid will continue to be siphoned from the limb 38 to the outlet 22 and the head 2 until the device is substantially empty.

When cleaning the equipment, the existence of the intermediate limb 28 forces cleaning fluid to purge the measuring device entirely of herbicide, so avoiding the possibility that the cleaning fluid may pass directly from the inlet spigot 20 to the limb 26, leaving a quantity of herbicide in the lower region of the housing 18.

Figure 8:
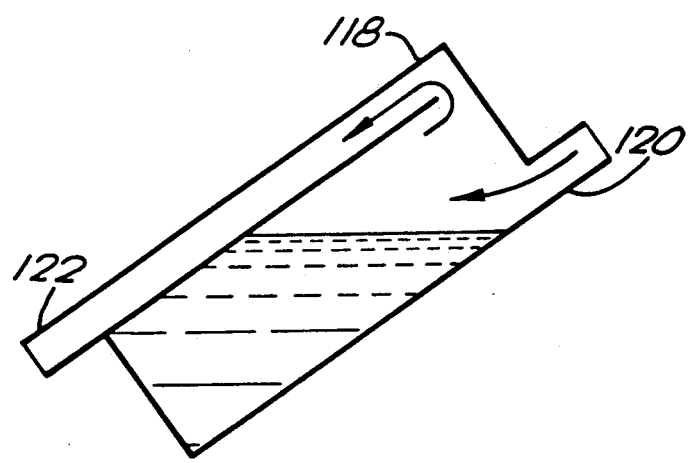
FIG. 8 shows a means of measuring the flow rate of a fluid, for use in equipment according to the second aspect of the invention.

FIG. 8 shows an alternative measuring device which may be used in equipment according to the second aspect of the invention. This alternative measuring device has an inlet spigot 120, an outlet spigot 122 and a housing 118 defining a chamber. This device is used for calibrating the flow in the same way as that shown in FIGS. 2, 3 and 4, but is of simpler construction, although it does not ensure thorough cleansing of the housing in the same way as the first device.

Figure 9:
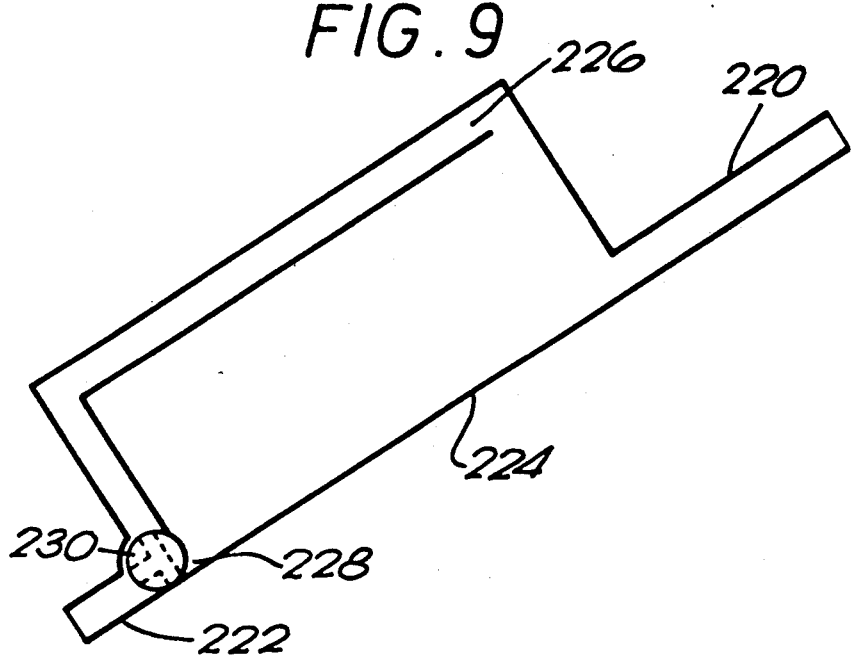
FIGS. 9 and 10 show a further means of measuring the flow rate of a fluid, for use in equipment according to the second aspect of the invention.
Figure 10:
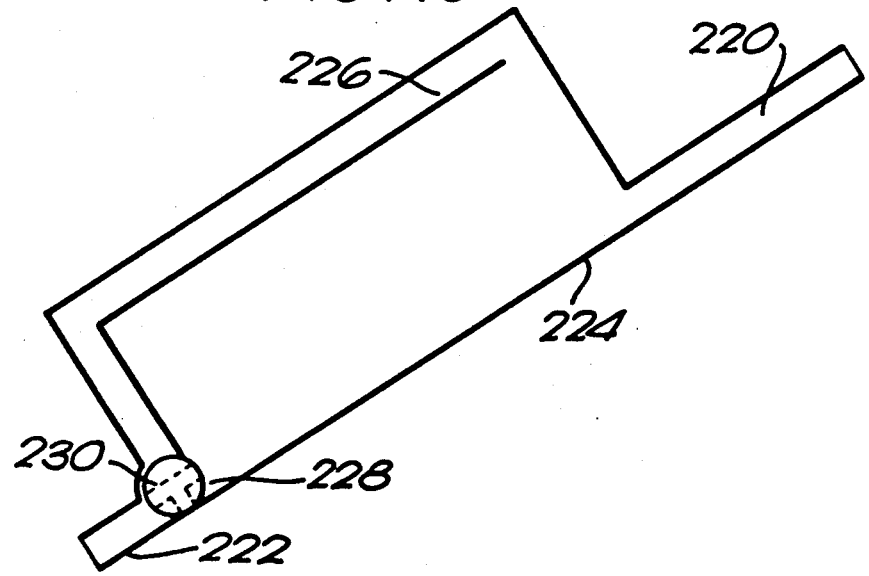

FIGS. 9 and 10 show a further alternative measuring device, for use in equipment according to the second aspect of the invention. This measuring device has an inlet spigot 220, an outlet spigot 222 and a housing defining a chamber 224. A vent pipe 226 runs from an upper region of the chamber 2 to a point on the outside of the chamber which, in normal use, will be located adjacent the lowermost region of the chamber. Also located at this point in the wall of the chamber is an outlet 228. A three-way valve 230 is located adjacent the outlet 228 at the junction of the vent pipe 226 and the outlet spigot 222.

The device is used, during calibration, with the valve 230 in the position shown in FIG. 9. Fluid is caused to flow through the inlet spigot 220 into the chamber 224 with the outlet 228 being sealed. Air originally present (and any overflowing fluid) escapes through the vent pipe 226 to the valve 230 and through the outlet spigot 222. When the measurement of the volume of the fluid flowing into the chamber 224 has been used to produce a calibration result, the valve 230 can be adjusted into the position shown in FIG. 10 for normal spraying operation to take place. In this position the valve 230 allows fluid connection between the outlet 228 and the outlet spigot 222. Thus, fluid flowing into the chamber 224 is allowed to pass through the outlet spigot 222 to the spraying head.

The card 40 is supplied with each container of herbicide, and provides a convenient means for achieving a desired flow rate without requiring the operator to perform complex calculations, or to refer to separate tables. Thus, the operator needs merely to know whether he is dealing with light, medium or heavy weed infestation, and the spraying width which he is using. The desired flow rate will also depend on the speed at which the operator intends to cover the area to be sprayed, and so the card is accurate for one specified operator walking speed. By fixing the card 40 directly to the measuring device, he is able to establish directly the volume which should appear in the measuring device after a test cycle. If he subsequently uses the same delivery equipment to distribute a different herbicide (or a composition for purposes other than weed killing), it is necessary only for the operator to remove the ZENNAPRON card and to replace it by the corresponding card from the new package. Of course, appropriate cleaning of the equipment may be necessary before changing over from one material to the other.

Although the use of the card 40 has been disclosed with specific reference to the measuring device shown in FIGS. 2 to 4 and 6, it could also be used with other measuring devices. In particular, similar cards could be used in conjunction with the calibration vessels disclosed in British Patent Application No. 8715222. Furthermore, use of cards 40 supplied with packages of herbicide or other materials is not confined to the establishment of a desired flow rate. For example, packages of fluids could be supplied with removable scales for use with measuring vessels in order to achieve a required volume for dilution purposes. Thus, a package of concentrated herbicide could include a removable card bearing a graduated scale representing different volumes of water, the cards being for use with a measuring device for dispensing the required volume of concentrated product to achieve the correct dilution in the indicated volume of water. In a particular embodiment of such a package, the measuring device comprises a cup mounted on a squeezable container for the product, the cup being connected to the container by means of a tube extending from the bottom of the container. A card, corresponding to the card 40, is provided with the package. It may be removable from the rest of the package, and intended to be affixed adjacent the measuring cup, or it may be located on the package adjacent the measuring cup. By squeezing the container, the product is discharged to the measuring cup until the required volume is present in the measuring cup, after which the product can be poured from the measuring cup into the container, such as a watering can, in which it is to be diluted in the appropriate quantity of water.

I claim:

1. A device for measuring flow in a fluid line, the device comprising:
   a chamber having first and second oppositely disposed ends;
   an inlet which opens into the chamber at the first end;
   an outlet which communicates with the chamber through a passage which opens into the chamber in the region of the second end of the chamber and which has a reverse bend situated in the region of the first end of the chamber; and
   a vent situated at the reverse bend, which vent provides direct communication between the passage and the chamber.

2. A device as claimed in claim 1, which includes a transparent wall to enable the level of fluid in the device to be visually ascertained.

3. A device claimed in claim 2, in which the transparent wall is provided in a wall of the chamber.

4. In combination, a device in accordance with claim 2 and a plurality of graduated scales which are selectively releasably affixable to the device for correlating flow received in the device with a predetermined fluid supply parameter.

5. A combination as claimed in claim 4, in which the graduated scales are provided on respective cards, and in which the device is adapted to releasably receive a selected one of the cards at a position adjacent the transparent wall portion.

6. A device as claimed in claim 1, which comprises a housing defining the chamber.

7. A device as claimed in claim 6, wherein the housing has an aperture in the region of the second end of the chamber, and has a groove, provided in its outer surface, and wherein the device further comprises a cover, sized to be located over the groove to partially define the passage between the housing and the cover.

8. A device as claimed in claim 1, in which the vent comprises a hole at the reverse bend in the passage.

9. Fluid delivery equipment comprising distribution means and a fluid supply line for conducting fluid to the distribution means, the fluid supply line including a device in accordance with claim 1.

* * * * *